United States Patent
Kawabata et al.

(10) Patent No.: US 6,295,095 B1
(45) Date of Patent: Sep. 25, 2001

(54) VIDEO SIGNAL CHARACTER CONVERTING DEVICE AND METHOD OF THE SAME

(75) Inventors: Minoru Kawabata; Atsuhisa Kageyama, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/359,597

(22) Filed: Jul. 23, 1999

(30) Foreign Application Priority Data

Jul. 24, 1998 (JP) .................................................. 10-208920

(51) Int. Cl.⁷ .............................. H04N 5/14; H04N 5/57
(52) U.S. Cl. ............................ 348/576; 348/651; 348/682
(58) Field of Search ...................................... 348/576, 625, 348/634, 649, 651, 678, 682, 688; H04N 5/14, 5/21, 3/24, 5/57

(56) References Cited

FOREIGN PATENT DOCUMENTS

| | | |
|---|---|---|
| 5-22704 | 1/1993 | (JP) . |
| 6-38074 | 2/1994 | (JP) . |
| 6-95632 | 4/1994 | (JP) . |
| 6-233235 | 8/1994 | (JP) . |
| 7-30796 | 1/1995 | (JP) . |
| 2543990 | 7/1996 | (JP) . |
| 10-23421 | 1/1998 | (JP) . |

*Primary Examiner*—Sherrie Hsia
(74) *Attorney, Agent, or Firm*—Ratner & Prestia

(57) ABSTRACT

In a video signal character converting device, a sampling window signal generator generates a signal for sampling an input video signal "a". A video scene amplitude discrimination circuit samples the video signal in response to the sampling signal, detects a change in image level either field by field or frame by frame based on an integrated value for every duration of vertical scanning, and outputs a resetting pulse when the change in picture level exceeds a predetermined level. A video scene periodicity discrimination circuit measures a time interval between two successive resetting pulses, and outputs a control signal if the time interval is shorter than a predetermined period. A video scene conversion circuit converts a video scene in response to the control signal. The video signal character detecting device of the present invention determines as to whether or not the input video signal has video images that present an adverse effect mentally and physically to viewers, by observing an image level and periodicity of the video signal in this manner. The device is thus able to output video images by converting them into a harmless level with a process of reducing contrast or blanking, if it determines the video images harmful.

7 Claims, 7 Drawing Sheets

VIDEO SIGNAL CHARACTER CONVERTING DEVICE AND METHOD OF THE SAME

FIELD OF THE INVENTION

The present invention relates to a video signal character detecting and converting device for converting video signal, which is transmitted from a visual transmitter to a visual apparatus such as a television receiver for displaying images. More specifically, a device of the present invention converts a video signal, if the signal contains images that include an intense flashing, a possible cause of an adverse effect mentally and/or physically to a viewer, into images having less effect to the viewer, according to prescribed specifications.

BACKGROUND OF THE INVENTION

Incidents in the recent year, in which children watching a television program of animated cartoon had suffered a seizure, has lead the broadcasting industry to set a guideline for video images to be broadcasted, and to place great importance on technique pertaining to detection and conversion of a video scene that may cause an adverse effect to human beings. It has been pointed out specifically that video images, in which a bright image having a duration of three vertical scanning and a dark image having a duration of three vertical scanning are displayed repeatedly, may cause an adverse effect mentally and/or physically to the viewers.

A video signal character detecting device for detecting a video scene based on presence or absence of a synchronizing signal has been known heretofore such as one disclosed in Japanese Patent Laid-Open Publication No. H06-233235, in order to avoid recording of signals that need not be recorded in apparatuses such as video recorders.

FIG. 7 shows a block diagram of a video signal character detecting device of the prior art. In FIG. 7, a synchronization detector 201 detects the presence or absence of a synchronizing signal. A microcomputer 202 suspends a recording operation of the video recorder when an unnecessary signal is detected. A signal separation circuit 203 separates a video signal from an input signal. A synchronizing signal separation circuit 204 separates a synchronizing signal contained in the video signal. A first differential circuit 205 differentiates the synchronizing signal. A second differential circuit 206 differentiates the video signal and the synchronizing signal. A subtraction circuit 207 generates a subtraction signal between the two differential signals. The subtraction signal corresponds to a differential signal of a video signal without a synchronizing signal.

The video signal character detecting device constructed as above operates in a manner, which will be described below.

First, the subtraction circuit 207 outputs the subtraction signal to the microcomputer 202. If the subtraction signal does not exceed a predetermined threshold, the microcomputer 202 determines the input signal as an unnecessary signal, and suspends a recording operation of the video recorder.

The foregoing structure has a problem, however, that it is unable to detect video scenes, which may cause an adverse effect to viewers, such as a scene, in which light and darkness are repeated periodically on an entire screen, or a scene, in which red and blue are repeated periodically.

DISCLOSURE OF THE INVENTION

A video signal character converting device of the present invention comprises:

(1) a sampling window signal generator for generating a sampling signal for a purpose of sampling an input video signal according to a vertical synchronizing signal and a horizontal synchronizing signal;
(2) a video scene amplitude discrimination circuit for sampling the video signal in response to the sampling signal, detecting a change in image every duration of vertical scanning of the sampled video signal, and outputting a resetting pulse according to a result of comparison of the change in image level with a predetermined value;
(3) a video scene periodicity discrimination circuit for measuring a time interval between two of the resetting pulses, and outputting a control signal by comparing the measured time interval with a predetermined period of time; and
(4) a video scene conversion circuit for reducing the change in image level in response to the control signal.

The video signal character detecting device of the present invention as described above is thus able to determine whether or not an input video signal is equivalent to the video scene that causes an adverse effect physically and/or mentally to viewers, such as a scene, in which light and darkness are repeated periodically on an entire screen, or a scene, in which red and blue are repeated periodically. Accordingly, a visual apparatus provided with the device of this invention is able to display video scenes, which are determined as containing an adverse effect, after converting them into scenes harmless to human beings. Video scenes of this nature will be hereinafter referred to as video scenes "harmful" to human.

DESCRIPTION OF THE PREFERRED EMBODIMENTS

First Exemplary Embodiment

Figure 1:
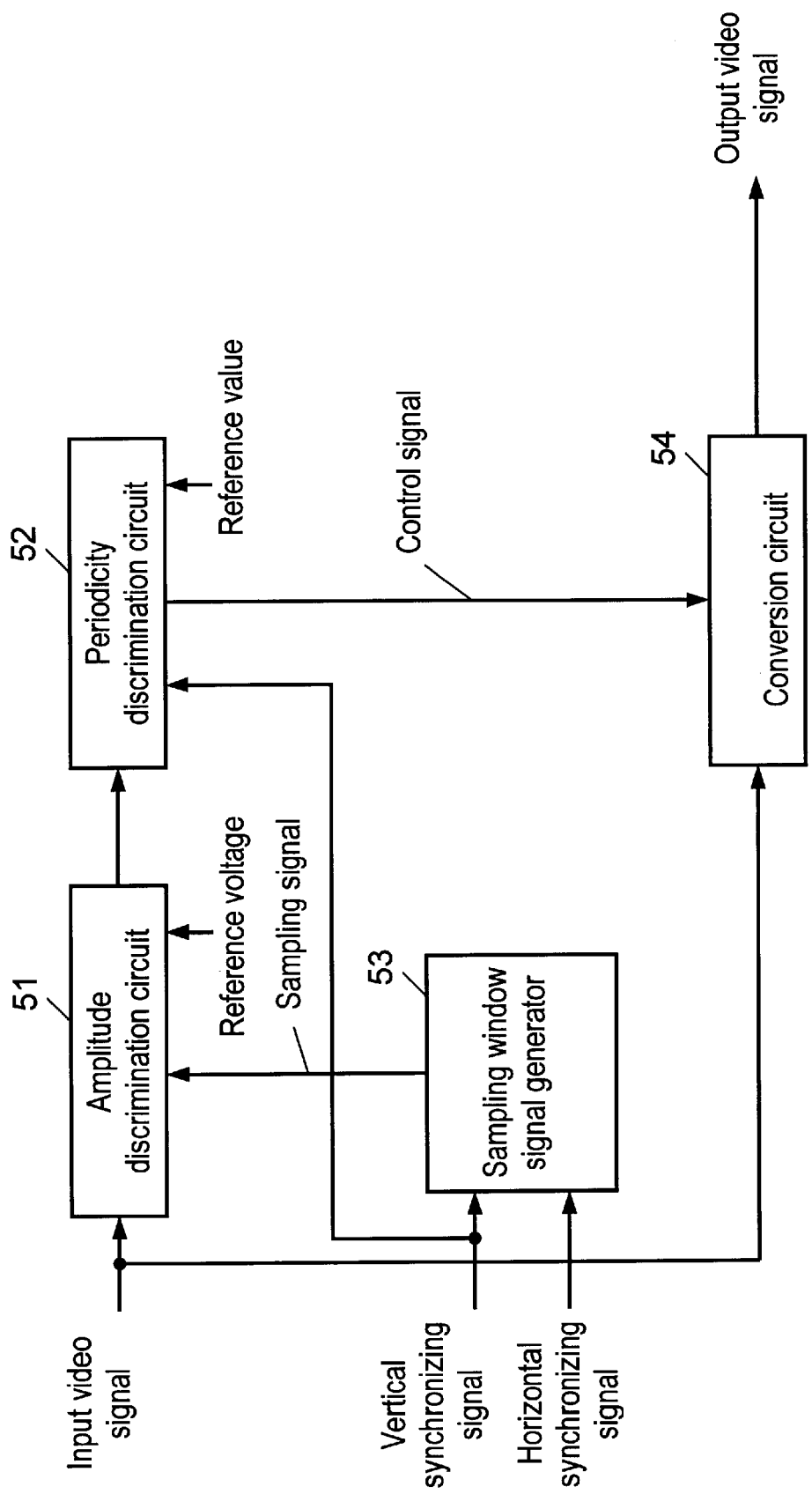
FIG. 1 is a block diagram of a video signal character converting device of a first exemplary embodiment of the present invention.

A video signal character detecting device of a first exemplary embodiment of the present invention will be described by referring to FIG. 1 and FIG. 2. FIG. 1 shows a block diagram of the video signal character detecting device of the first exemplary embodiment of this invention.

In FIG. 1, a sampling window signal generator 53 outputs a sampling signal for setting a timing to sample an input video signal based on a vertical synchronizing signal and a horizontal synchronizing signal. An amplitude discrimination circuit 51 samples the input video signal in response to the sampling signal, and integrates the sampled video signal in every duration of vertical scanning. The amplitude discrimination circuit 51 detects a change in video level either field by field or frame by frame through calculation of a difference between two integrated values obtained successively. The amplitude discrimination circuit 51 then outputs a resetting pulse if it detects a video scene, in which the change in video level is greater than a reference voltage. A periodicity discrimination circuit 52 counts a number of vertical synchronizing pulses within a time interval of two successive resetting pulses, and outputs a control signal if the number of vertical synchronizing pulses is less than a reference value. A conversion circuit 54 converts the input video signal by reducing the picture level in response to the control signal, in order to make a displayed image harmless to human beings.

Figure 2:
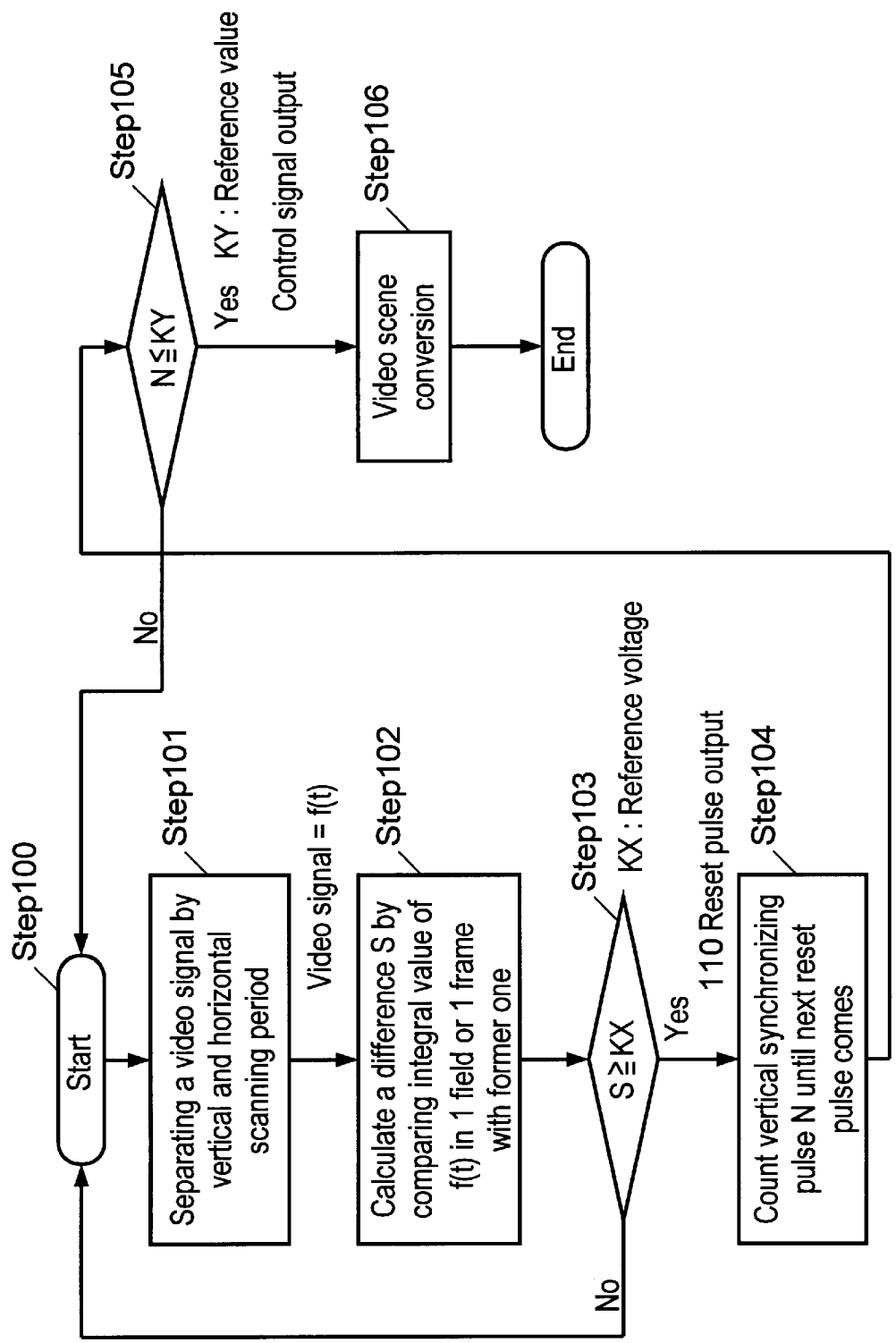
FIG. 2 is a flowchart depicting an operation of the device of FIG. 1.

Referring to FIG. 2, the video signal character detecting device depicted in FIG. 1 operates in a manner as described hereinafter.

When the input video signal is fed into the amplitude discrimination circuit 51 (step 100), the sampling window signal generator 53 outputs a sampling pulse in a predetermined timing based on the vertical synchronizing signal and the horizontal synchronizing signal. The amplitude discrimination circuit 51 separates a video signal "f (t)" from the input video signal in response to the sampling pulse (step 101), and integrates the video signal "f(t)". The integrated value represents a picture level in one field. The amplitude discrimination circuit 51 compares picture levels obtained successively from one field to another or from one frame to another, and calculates a difference "S" in the picture level (step 102). The amplitude discrimination circuit 51 then outputs a resetting pulse if the difference "S" is greater than a reference voltage "KX", or it recaptures the input video signal it the difference "S" is smaller than the reference voltage "KX" (step 103).

The periodicity discrimination circuit 52 starts counting a number of vertical synchronizing pulses when it is input with the resetting pulse, and continues the counting until it receives another resetting pulse (step 104). The periodicity discrimination circuit 52 outputs a control signal if a number "N" of the counted vertical synchronizing pulses is smaller than a reference value "KY" (step 105), so as to control the conversion circuit 54 with the control signal (step 106). The amplitude discrimination circuit 51 recaptures the input video signal if the number "N" of the vertical synchronizing pulses is greater than the reference value "KY ".

The foregoing structure allows the device to make determination of a video signal as being harmful, if the signal has a great change of level in a magnitude exceeding the reference voltage, and the great change of level is repeated within a time interval smaller than the reference value, and also to make determination of all other video signals as being harmless.

However, the foregoing structure is not capable of converting every harmful video scenes into harmless video scene, since the conversion circuit 54 does not function until the periodicity discrimination circuit 52 outputs a control signal after the amplitude discrimination circuit 51 receives an input of video signal equivalent to the harmful video scene. In order to convert every harmful video scenes, the device requires a delay circuit (not shown in FIG. 1) to be placed before an input port of the conversion circuit 54 so as to delay the input video signal, and to synchronize the video signal with the control signal.

Second Exemplary Embodiment

Figure 3:
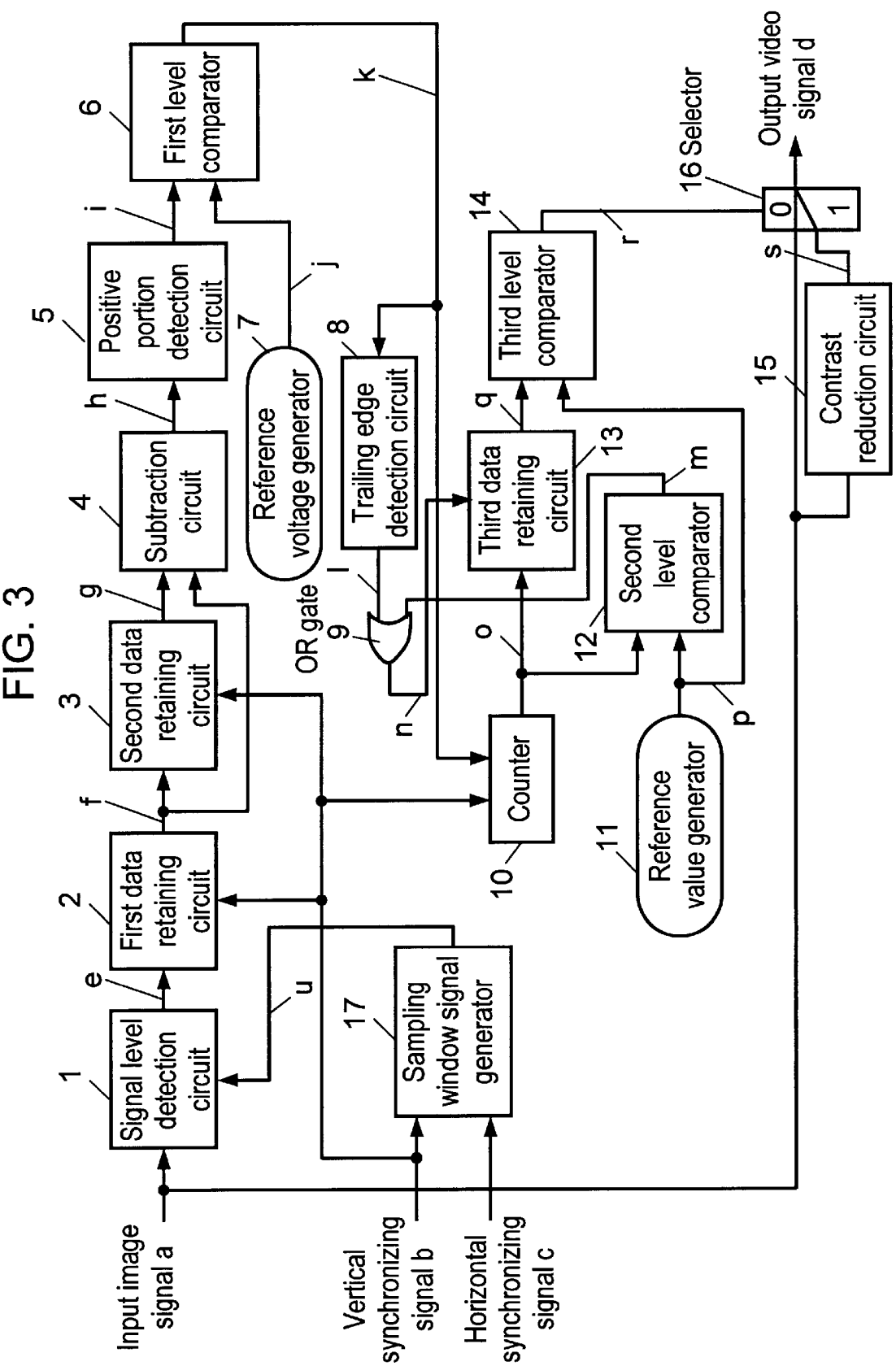
FIG. 3 is a block diagram of a video signal character converting device of a second exemplary embodiment of the present invention.

A video signal character converting device of a second exemplary embodiment of the present invention will be described by referring to FIG. 3 and FIG. 4. FIG. 3 shows a block diagram of the video signal character converting device of the second exemplary embodiment of this invention.

In FIG. 3, a signal level detection circuit 1 integrates an input video signal "a" in response to a sampling signal "u ", and outputs a result. In other words, the signal level detection circuit 1 detects a magnitude of the input video signal. A first data retaining circuit 2 retains a detected result "e" of the signal level detection circuit 1 for a predetermined period of time. A second data retaining circuit 3 retains an output data "f" of the first data retaining circuit 2 for a predetermined period of time. A subtraction circuit 4 outputs a difference between the output "f" of the first data retaining circuit 2 and an output "g" of the second data retaining circuit 3. A positive detection circuit 5 allows only a positive portion of an output signal "h" of the subtraction circuit 4 to pass through. A first level comparator 6 compares an output "i" of the positive detection circuit 5 with a reference voltage "j" output by a reference voltage generator 7. A trailing edge detection circuit 8 detects a trailing edge of an output signal "k" of the first level comparator 6. A counter 10 counts vertical synchronizing signals "b" by taking the output signal "k" of the first level comparator 6 as a resetting signal. A second level comparator 12 compares an output data "o" of the counter 10 with a second reference value "p" output by a reference value generator 11. An OR gate 9 performs a logical OR operation with an output signal "m" of the second level comparator 12 and an output signal "l" of the trailing edge detection circuit 8. A third data retaining circuit 13 retains the output data "o" of the counter 10 for a predetermined period of time by taking an output signal "n" of the OR gate 9 as a clock signal. A third level comparator 14 compares an output data "q" of the third data retaining circuit 13 with the second reference data "p ". A sampling window signal generator 17 outputs a signal for appointing a timing sample the input video signal "a" based on a vertical synchronizing signal "b" and a horizontal synchronizing signal "c ". A contrast reduction circuit 15 decreases the picture level of the input video signal "a" so as to reduce a contrast ratio of the displayed video scene. A selector 16 selects and outputs either of an output signal "s" of the contrast reduction circuit 15 or the input video signal "a" according to a control signal "r" output by the third level comparator circuit 14.

Figure 4:
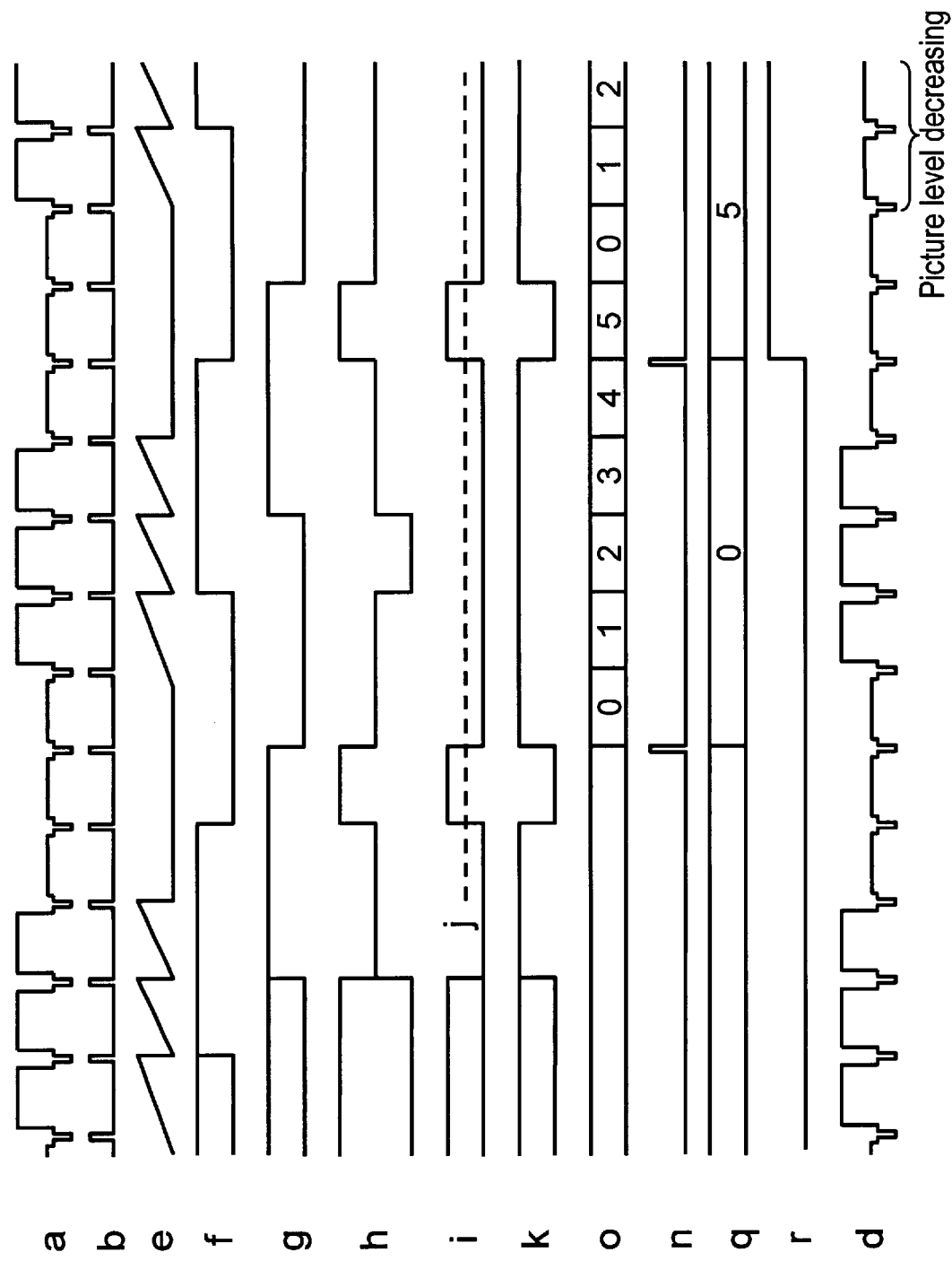
FIG. 4 is a drawing depicting waveforms at various points in the video signal character converting device of FIG. 3.

FIG. 4 shows waveforms of signals at various points in the block diagram of FIG. 3. Referring to FIG. 4, described below is an example, in which the input video signal "a" has such waveform that a high level and a low level are repeated alternately at every duration of three vertical scanning. For a purpose of the description, it is assumed that the vertical synchronizing signal "b" is a signal of high level during a vertical blanking period.

The signal level detection circuit 1 receives the input video signal "a", and outputs an integrated value signifying a picture level. A waveform "e" in FIG. 4 represents the integrated value, which is a digital data, but depicted in analog wave form. The first data retaining circuit 2 receives and holds the signal "e", and outputs a signal "f" when receiving the vertical synchronizing signal "b".

The second data retaining circuit 3 receives and holds the signal "f", and outputs a signal "g" when receiving the vertical synchronizing signal "b ". The subtraction circuit 4 calculates a difference between these signals "f" and "g", and outputs a signal "h".

The positive detection circuit 5 receives an input of the signal "h", and output a signal "i" by allowing the signal "h" to pass through only when the input signal has a positive potential.

The first level comparator 6 outputs a signal of low level if the signal "i" is greater than the first reference voltage "j", or it outputs a signal of high level if otherwise. The output signal of the first level comparator 6 is represented by a waveform "k" in the present exemplary embodiment.

The counter 10 is reset when the signal "k" is at low level. The output data "o" of the counter 10 is incremented, beginning with 0, as shown in FIG. 4.

The second level comparator circuit 12 compares the data "o" with the second reference value "p", and outputs a signal "m" of high level if the data "o" is greater than the second reference data "p", or it outputs a signal "m" of low level if otherwise. The second reference data "p" represents a reference level for determination as to whether duration of repeating light and darkness of the video image is harmful or harmless. In other words, the second level comparator 12 determines a video signal as being harmful if the data "o" is smaller than the second reference value "p", or harmless if otherwise.

The OR gate 9 performs a logical OR operation with the output signal "l" of the trailing edge detection circuit 8 and the signal "m", and outputs a signal "n". The third data retaining circuit 13 retains the output data "o" of the counter 10 in response to the signal "n", and outputs it as a data "q". The third level comparator 14 compares the data "q" with the second reference data "p", and outputs a signal of high level if the data "q" is smaller than the second reference value "p", or a signal of low level if otherwise. The selector 16 outputs the video signal "s" of the contrast reduction circuit 15 if the output signal "r" of the third level comparator 14 is "1", or outputs the input video signal "a" if the output signal "r" is "0".

With the foregoing structure, the video signal character detecting device detects a video image that is harmful to human beings such as ones, in which which light and darkness, or red and blue are repeated on an entire screen at predetermined interval. Consequently, the device outputs a harmless video image by reducing a picture level of the video signal.

(Third Exemplary Embodiment)

Figure 5:
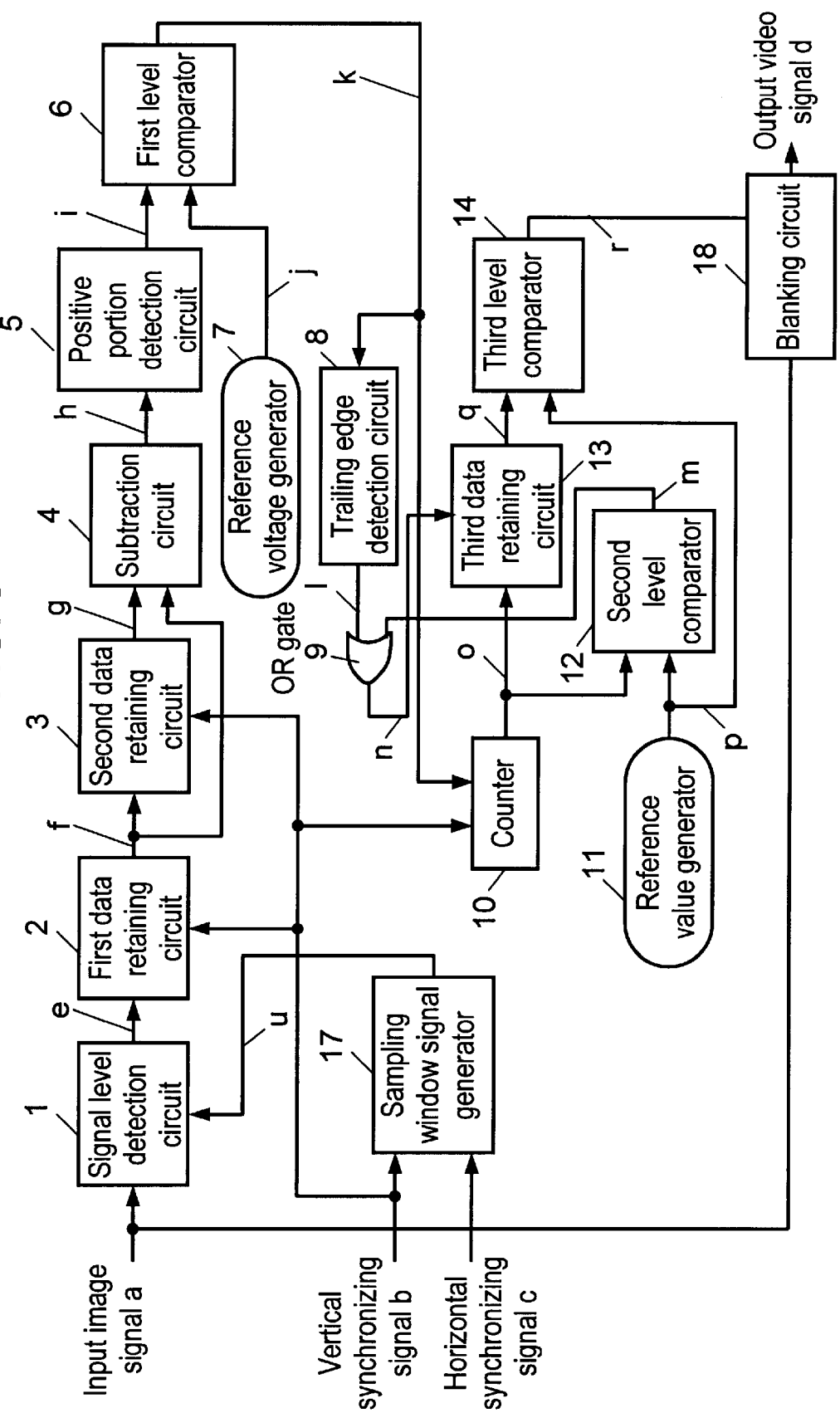
FIG. 5 is a block diagram of a video signal character converting device of a third exemplary embodiment of the present invention.
Figure 6:
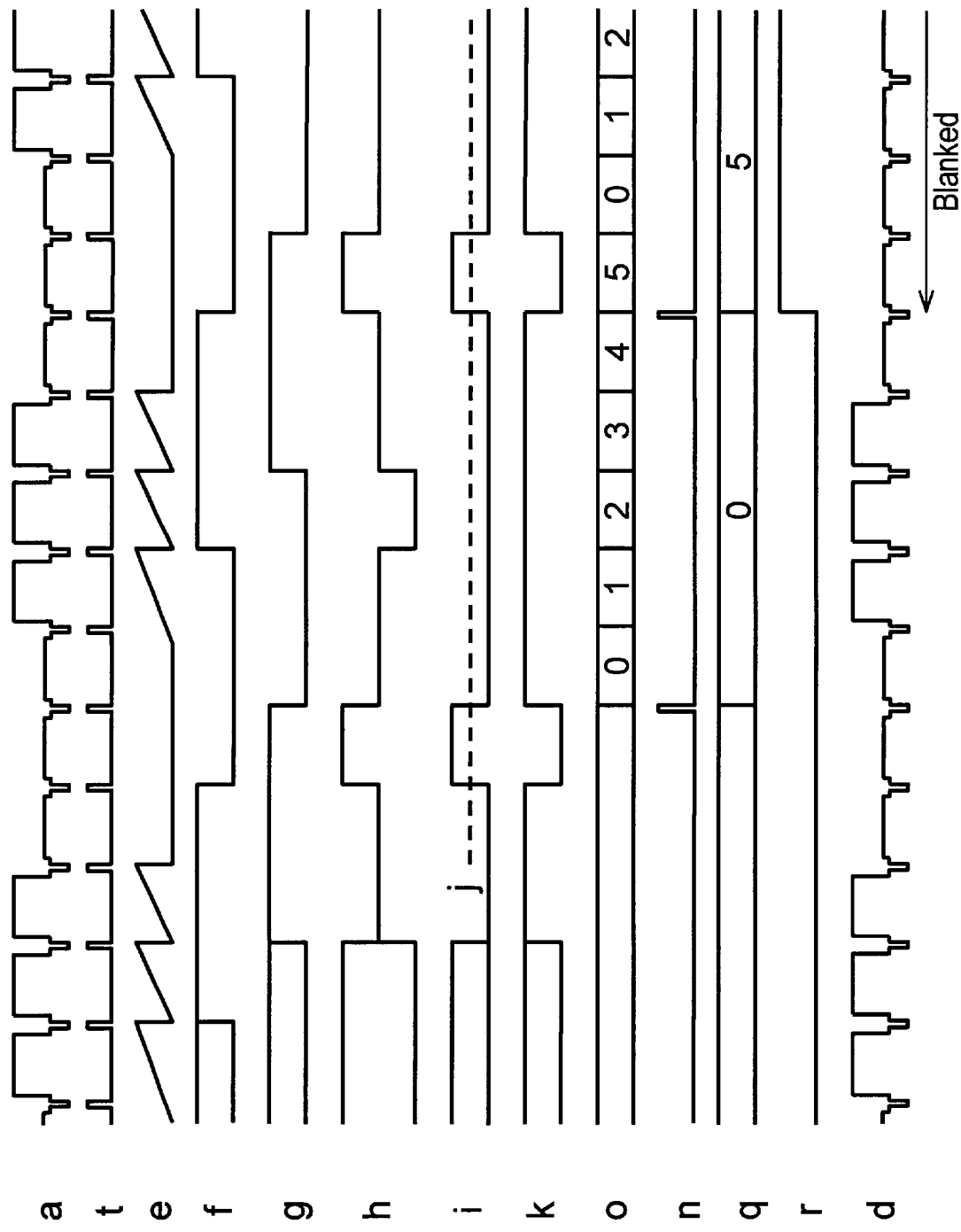
FIG. 6 is a drawing depicting waveforms at various points in the video signal character converting device of FIG. 5.
Figure 7:
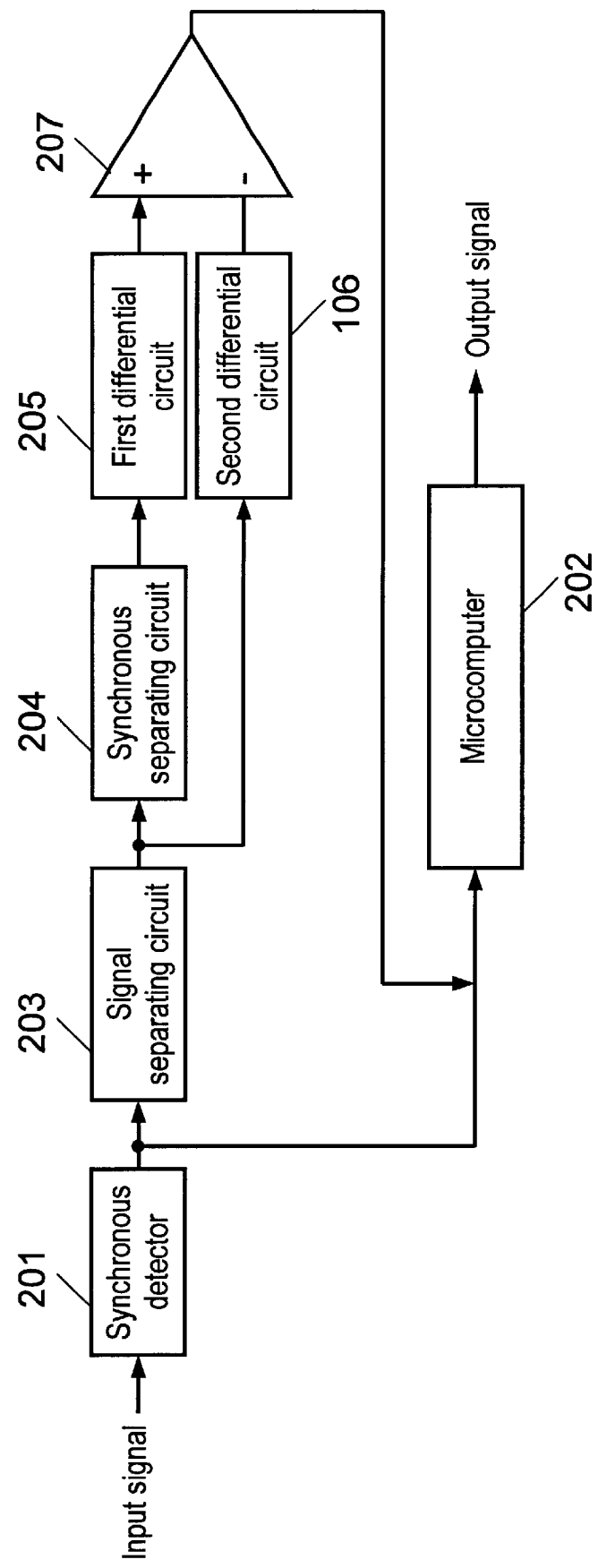
FIG. 7 is a block diagram of a video signal character detecting device of the prior art.

A video signal character converting device of a third exemplary embodiment of the present invention will be described hereinafter by referring to FIG. 5 and FIG. 6. FIG. 5 shows a block diagram of the video signal character converting device of the third exemplary embodiment of this invention. FIG. 6 is a drawing showing waveforms at various points of the converting device of FIG. 5. In this exemplary embodiment, any components common to the converting device of the second exemplary embodiment shown in FIG. 3 are assigned with the same reference numerals, and detailed descriptions will be omitted in order to avoid repetition. The third exemplary embodiment differs from the second exemplary embodiment in that the control signal "r" output by the third level comparator 14 controls a blanking circuit 18.

The video signal character converting device of the present exemplary embodiment comprises a signal level detection circuit 1, a first data retaining circuit 2, a second data retaining circuit 3, a subtraction circuit 4, a positive detection circuit 5, a first level comparator 6, a reference voltage generator 7, a trailing edge detection circuit 8, an OR gate 9, a counter 10, a reference value generator 11, a second level comparator 12, a third data retaining circuit 13, a third level comparator 14, a sampling window signal generator 17, and the blanking circuit 18, as shown in FIG. 5. The blanking circuit 18 performs blanking of an input video signal "a" in response to the control signal "r" output by the third level comparator 14.

An operation of the device will be described hereinafter.

In FIG. 6, the device operates in the same manner as that of the second exemplary embodiment for generating the control signal "r" from the input video signal "a". The control signal "r" signifies that an input video signal is determined to be harmful if the signal "r" is "1", and harmless if the signal "r" is "0". The blanking circuit 18 outputs a blanked video signal "d" by executing a blanking operation on the input video signal "a" if the control signal "r" is "1", or it outputs the input video signal "a" as a video signal "d" by leaving it intact if the control signal "r" is "0".

With the foregoing structure, the video signal character converting device detects a video image harmful to human beings such as ones, in which brightness level of a video luminance signal repeats light and darkness periodically, or a video color difference signal repeats red and blue periodically, so as to be capable of blanking the video image signal to be output.

Accordingly, the video signal character converting device of the foregoing structure detects the video image that is harmful to human beings such as those, in which light and darkness are repeated on an entire screen at predetermined intervals, or red and blue are repeated, and outputs a harmless video image by blanking the video output image signal.

In the foregoing first through third exemplary embodiments, the input image signal can be any one of a video luminance signal, a video color differential signal, a video RGB signal, and a digital video signal.

INDUSTRIAL APPLICABILITY

As has been described, the present invention provides a video signal character converting device, which detects a video image harmful to human beings such as one, in which light and darkness, or red and blue are repeated on an entire screen at predetermined intervals, and converts it into a harmless video image to be output for display.

What is claimed is:

1. A video signal character converting device comprising:
a sampling window signal generator for generating a sampling signal responsive to a vertical synchronizing signal and a horizontal synchronizing signal;
a video scene amplitude discrimination circuit for sampling a video signal responsive to said sampling signal in order to obtain a plurality of integrated values correspond to said video signal, detecting a change in picture level by comparing said integrated values with a predetermined value and transmitting a resetting pulse based on a result of said comparison;
a video scene periodicity discrimination circuit for measuring a time interval between two of said resetting pulses, and outputting a control signal if the measured time interval is less than a predetermined period of time; and
a video scene conversion circuit for reducing said change in picture level in response to said control signal being output.

2. The video signal character converting device according to claim 1, wherein said video scene amplitude discrimination circuit comprises:
- a signal level detection circuit for detecting a magnitude of said video signal;
- a first data retaining circuit for retaining an output of said signal level detection circuit for said predetermined period of time;
- a second data retaining circuit for retaining an output of said first data retaining circuit for said predetermined period of time;
- a subtraction circuit for calculating a difference between said output of said first data retaining circuit and said output of said second data retaining circuit;
- a positive detection circuit for permitting passage of only a positive portion of an output signal of said subtraction circuit; and
- a first level comparator circuit for comparing an output of said positive detection circuit with a first reference voltage, and outputting a resetting pulse if said output of the positive detection circuit is greater than said first reference voltage.

3. The video signal character converting device according to claim 2, wherein said video scene periodicity discrimination circuit comprises:
- a trailing edge detection circuit for detecting a trailing edge of an output signal of indicating the result of said comparison;
- a counter for receiving said resetting pulse as a resetting signal and said vertical synchronizing signal as a clock signal;
- a second level comparator for comparing an output of said counter with a second reference value;
- an OR gate for performing a logical OR operation with an output of said second level comparator and an output of said trailing edge detection circuit;
- a third data retaining circuit for retaining an output of said counter by receiving an output signal of said OR gate as a clock signal; and
- a third level comparator for comparing an output of said third data retaining circuit with said second reference value, and outputting the control signal if said output data of the third data retaining circuit is smaller than said second reference value.

4. The video signal character converting device according to claim 1, wherein said video scene conversion circuit comprises:
- a contrast reduction circuit for reducing a contrast of said video signal; and
- a selector for selecting and outputting either of said video signal and an output of said contrast reduction circuit in response to said control signal.

5. The video signal character converting device according to claim 1, wherein said video scene conversion circuit comprises a blanking circuit for blanking said video signal in response to said control signal.

6. The video signal character converting device according to claim 1 further comprising a delay circuit for delaying said video signal, wherein an output of said delay circuit is input to said video scene conversion circuit.

7. A method for converting a video signal character comprising the steps of:
a) generating a sampling signal based on a vertical synchronizing signal and a horizontal synchronizing signal;
b) sampling said video signal in response to said sampling signal, and obtaining an integrated value based on the sampled video signal;
c) detecting a change in image level based on said integrated value, and outputting a resetting pulse if said change in image level is greater than a predetermined value;
d) counting a number of vertical synchronizing pulses between two of said resetting pulses;
e) outputting a control signal if a number of vertical synchronizing pulses obtained in said step d) is smaller than a predetermined number; and
f) reducing picture level in response to said control signal.

* * * * *